(12) United States Patent
Wade et al.

(10) Patent No.: US 8,104,281 B2
(45) Date of Patent: Jan. 31, 2012

(54) NESTED VALVE AND METHOD OF CONTROL

(75) Inventors: Robert Andrew Wade, Dearborn, MI (US); Fadi Maroun Naddaf, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/044,062

(22) Filed: Mar. 9, 2011

(65) Prior Publication Data
US 2011/0265472 A1 Nov. 3, 2011

(51) Int. Cl.
*F02D 23/00* (2006.01)
*F16K 39/02* (2006.01)
*F16K 1/00* (2006.01)
*F16K 1/36* (2006.01)
*F16K 5/00* (2006.01)
*F16K 5/06* (2006.01)

(52) U.S. Cl. .......... 60/602; 137/630; 137/875; 251/205; 251/304; 251/315.06

(58) Field of Classification Search .............. 60/602; 137/630, 875; 251/205, 304, 315.06
See application file for complete search history.

(56) References Cited

U.S. PATENT DOCUMENTS

| | | | |
|---|---|---|---|
| 3,035,408 A * | 5/1962 | Silver | 60/602 |
| 3,096,614 A * | 7/1963 | Silver et al. | 60/602 |
| 3,104,520 A * | 9/1963 | Cazier et al. | 60/602 |
| 3,389,553 A * | 6/1968 | Hardy et al. | 417/28 |
| 4,005,578 A | 2/1977 | McInerney | |
| 4,120,156 A | 10/1978 | McInerney | |
| 4,207,743 A * | 6/1980 | Ecomard et al. | 60/611 |
| 4,256,019 A | 3/1981 | Braddick | |
| 4,387,572 A | 6/1983 | Richardson et al. | |
| 4,424,781 A | 1/1984 | Speer et al. | |
| 5,079,921 A | 1/1992 | McCandless et al. | |
| 5,908,047 A * | 6/1999 | Nakamura et al. | 137/875 |
| 6,543,228 B2 | 4/2003 | Deacon | |
| 6,647,710 B2 * | 11/2003 | Nishiyama et al. | 60/286 |
| 6,843,264 B2 * | 1/2005 | Chang et al. | 137/14 |
| 6,941,755 B2 | 9/2005 | Bucknell et al. | |
| 2002/0033194 A1* | 3/2002 | Gagnon | 137/875 |
| 2008/0022679 A1 | 1/2008 | Hara et al. | |
| 2009/0183507 A1* | 7/2009 | Weaver et al. | 60/602 |
| 2009/0191048 A1 | 7/2009 | Berger et al. | |
| 2009/0217661 A1 | 9/2009 | Gruel | |
| 2009/0265080 A1 | 10/2009 | Fry et al. | |
| 2010/0011761 A1 | 1/2010 | Wirbeleit et al. | |
| 2010/0043429 A1* | 2/2010 | Wolk et al. | 60/602 |
| 2010/0229550 A1* | 9/2010 | Kuspert et al. | 60/602 |

FOREIGN PATENT DOCUMENTS

JP 2009203835 A 9/2009

* cited by examiner

*Primary Examiner* — Thomas Denion
*Assistant Examiner* — Cameron Setayesh
(74) *Attorney, Agent, or Firm* — Julia Voutyras; Alleman Hall McCoy Russell & Tuttle LLP

(57) ABSTRACT

A valve in an engine exhaust system is disclosed. The valve can improve engine operation and reduce engine component degradation during cold engine starting. The valve may also be configured to provide different levels of restriction to exhaust gases flowing to a turbocharger turbine.

20 Claims, 5 Drawing Sheets

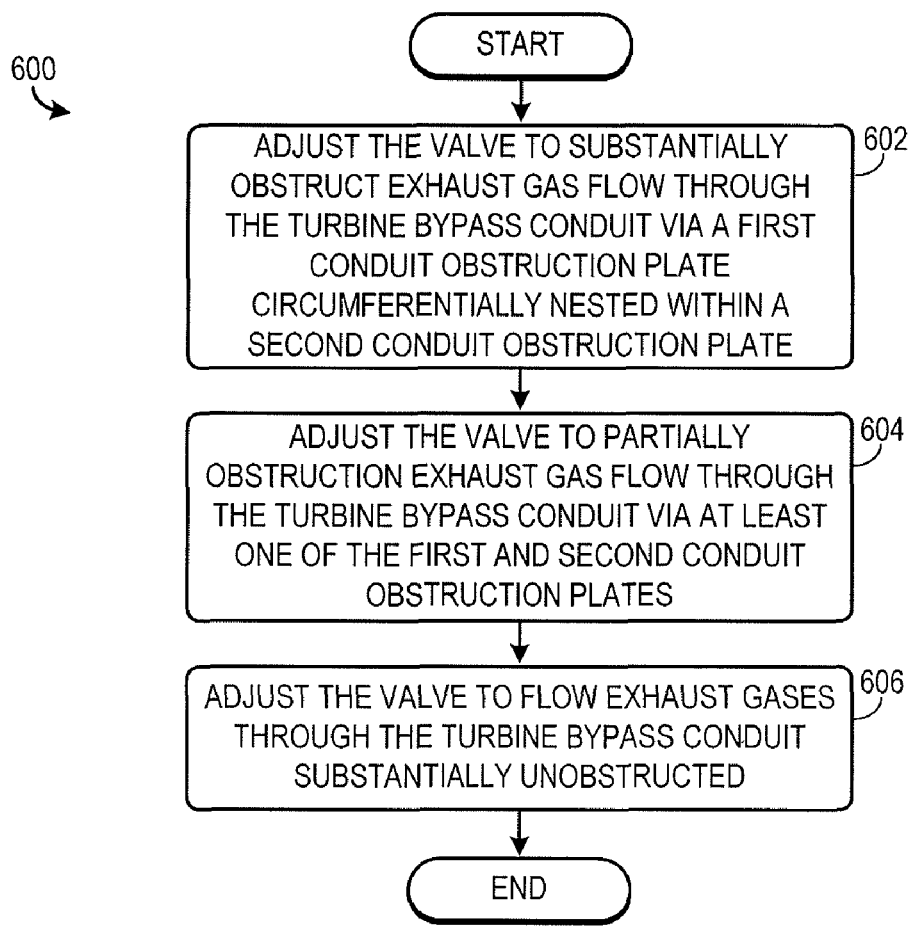

NESTED VALVE AND METHOD OF CONTROL

BACKGROUND/SUMMARY

Turbochargers are utilized with engines to increase the power output to weight ratio of the engine. However, engines may not need maximum boost from a turbocharger during certain operating conditions. For example, maximum boost may not be desirable when the engine is operating at knock limited conditions. Therefore, an amount of boost provided by a turbocharger may be adjusted based on engine operating conditions. One way of limiting turbocharger boost is via a wastegate. By adjusting a position of a wastegate, a portion of exhaust energy may bypass the turbocharger so that boost is limited.

However, during some operating conditions, it may be difficult to activate the wastegate so that boost can be limited. For example, at lower boost pressures and exhaust pressures there may not be enough pressure to overcome a wastegate biasing spring. Consequently, substantially all the exhaust energy is directed to the turbocharger. Thus, turbocharger operation may not be limited as may be desirable due to various design constraints of the turbocharger, bypass conduit, and the valve configuration. And, when a turbocharger is operated during cold operating conditions, components may degrade at a higher rate than is desired since exhaust energy may rotate components when lubricants may not be as effective as is desired. Therefore, it may be desirable to limit boosting during certain operating conditions, such as during cold starts. Compressor bypass valves have also been developed for use in conjunction with wastegates to substantially limit turbocharger operation during certain operating conditions, such during start-up.

The Inventors herein have found some disadvantages related to incorporating both a wastegate and a bypass valve into a turbocharger. For example, the design, manufacturing, and repair cost of the turbocharger may be increased when both a wastegate and a bypass valve are incorporated into a turbocharger system. Moreover, the likelihood of component degradation may be increased when the turbocharger's complexity is increased.

As such, various example systems and approaches are described herein. In one example, an exhaust valve comprising a first plate is configured to obstruct a first portion of a turbine bypass conduit and a first portion of a turbine inlet conduit is provided. The exhaust valve is further comprised of a second plate configured to obstruct a second portion of the turbine bypass conduit and the turbine inlet conduit. The turbine bypass conduit is substantially blocked when the first plate and the second plate are positioned together in a first plane. The exhaust valve further includes an actuation assembly configured to independently adjust the first and second plates.

In this way, operation of the turbocharger may be substantially inhibited during certain operating conditions and turbocharger operation may be throttled during other operating conditions. Thus, an engine's efficiency may be increased over a wide range of engine operating conditions by the valve.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 6 shows a method for operation of a valve in an engine.

DETAILED DESCRIPTION

Various example systems and approaches are described herein to improve turbocharged engine operation. In one example, a valve disposed in a turbine bypass conduit of a turbine of an engine, the turbine including a turbine inlet is provided. The valve includes a first plate configured to obstruct a portion of the turbine bypass conduit in a first position and obstruct a portion of the turbine inlet in a second position and a second plate configured to obstruct a portion of the conduit in a first position and obstruct a portion of the turbine inlet in a second position. The valve further includes an actuation assembly configured to independently adjust the first and second plates.

In this way, a variety of flowrates through the turbine bypass conduit may be attained via a single valve. Furthermore, turbine operation may be substantially inhibited without unduly increasing the backpressure in the exhaust system, thereby increasing the engine efficiency. In this way, the turbocharger can be adjusted to provide a selected amount of boost to the engine over a wide range of operating conditions via a single valve, decreasing the complexity of the turbocharger. Thus, the valve may be used as a wastegate to throttle gas flowing through the turbine bypass conduit as well as provide complete bypass functionality to substantially inhibit boosting without substantially increasing the backpressure in the exhaust system.

Figure 1:
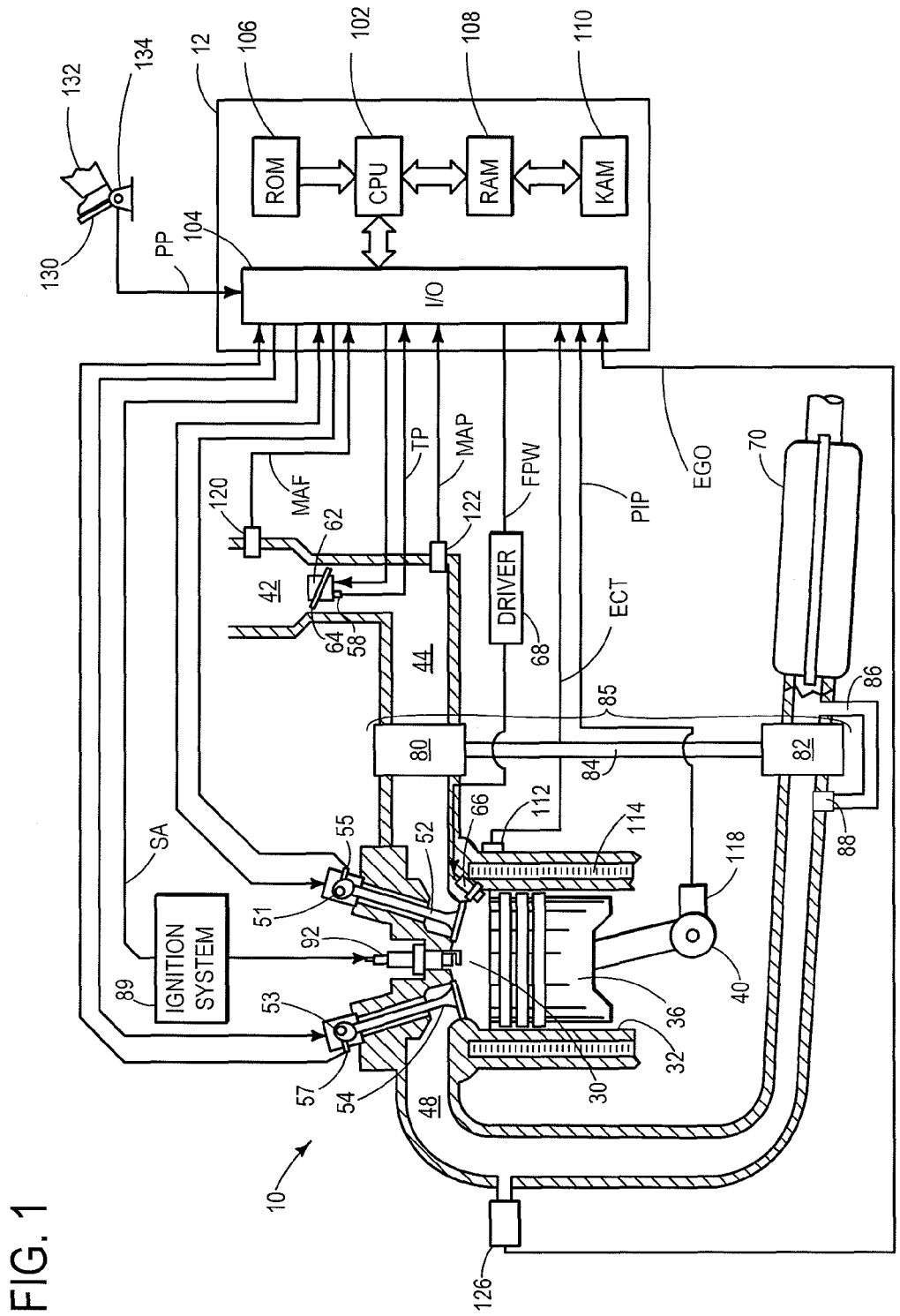
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures. Additionally or alternatively a fuel injector may be positioned upstream of intake valve 52 and configured to inject fuel into the intake manifold, which is known to those skilled in the art as port injection.

Distributorless ignition system 89 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Engine 10 may further include a turbocharger 85 having a compressor 80 positioned in intake manifold 44 coupled to a turbine 82 positioned in exhaust manifold 48. A driveshaft 84 may couple the compressor to the turbine. Thus, turbocharger 85 may include compressor 80, turbine 82, and driveshaft 84. Exhaust gases may be directed through the turbine, driving a rotor assembly which in turn rotates the driveshaft. In turn the driveshaft rotates an impeller included in the compressor configured to increase the density of the air delivered to combustion chamber 30. In this way, the power output of the engine may be increased. A turbine bypass conduit 86 may be coupled upstream and downstream of turbine 82. A valve 88 may be located at the junction of turbine bypass conduit 86 and exhaust manifold 48. The valve may be configured to adjust flowrate of the gas through the turbine bypass conduit. The system and corresponding components shown in FIG. 1 are schematically depicted.

Figure 2:
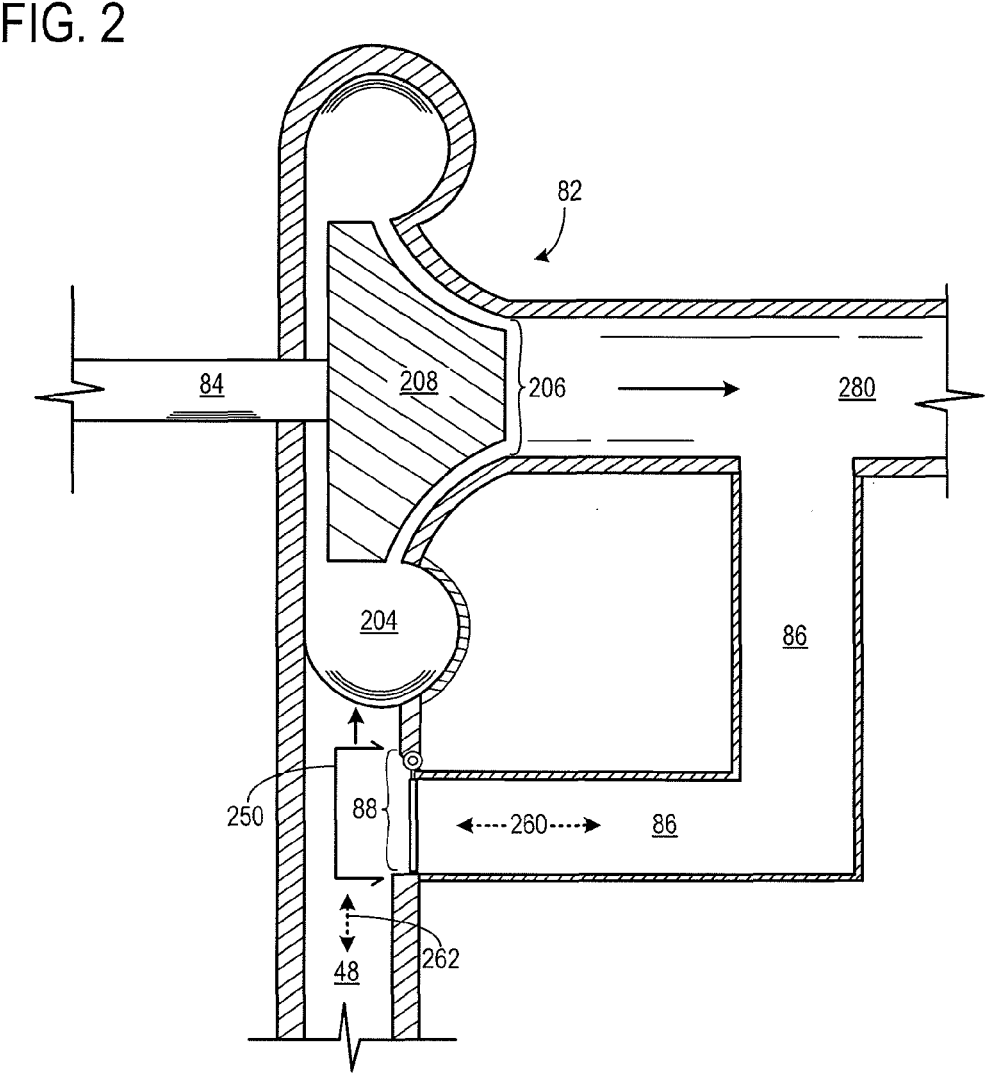
FIG. 2 shows a schematic depiction of a turbine and a valve included in a turbocharger in the engine shown in FIG. 3.

FIG. 2 depicts an example turbine 82, turbine bypass conduit 86, and valve 88. As shown, turbine bypass conduit 86 is fluidly coupled upstream of a turbine inlet 204 and downstream of a turbine outlet 206. In particular, engine exhaust from exhaust manifold 48 may enter turbine inlet 204 or bypass conduit 86 before entering exhaust collector 280. In this way, exhaust gases may pass through or circumvent turbine 82. It will be appreciated that FIG. 2 is not drawn to scale.

When turbine 82 is in operation, exhaust gases may flow into an impeller 208 of the turbine which in turn rotates driveshaft 84. It will be appreciated that driveshaft 84 may be coupled to compressor 80, shown in FIG. 1. In this way, the exhaust gases may be used to generate rotational energy which in turn drives compressor (e.g., element 80 in FIG. 1), thereby elevating the pressure in intake manifold (e.g., element 44 in FIG. 1) to increase the output and/or efficiency of engine 10. In other words, the turbocharger may be operated to provide boost to the engine.

Continuing with FIG. 2, valve 88 is positioned at the junction of the exhaust manifold 48 and turbine bypass conduit 86 including an axis 260. In some examples, a cross-sectional area of the turbine bypass conduit spanning the conduit perpendicular to axis 260 is greater than or equal to a cross-sectional area of exhaust manifold 48 spanning the exhaust manifold perpendicular to axis 262. In this way, exhaust gases may be routed around turbine 82 without substantially increasing the backpressure in the exhaust system. As discussed below with regard to FIG. 3, valve 88 may include a first plate and a second plate. The first and second plates may be independently adjusted to alter the flow of exhaust gases through the turbine bypass conduit 86 and turbine 82. Cutting plane 250 defines the cross-section shown in FIG. 3.

Figure 3:
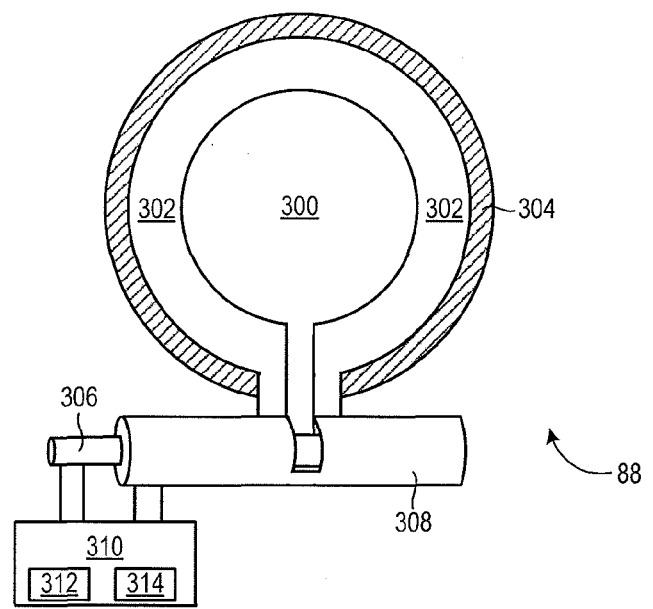
FIG. 3 shows a cross-sectional view of the valve shown in FIG. 3.

Now referring to FIG. 3, a cross-sectional view of a portion of valve 88 is depicted. A first obstruction plate 300 and a second obstruction plate 302 are included in valve 88. The obstruction plates are positioned in turbine bypass conduit 86 including conduit wall 304. As shown, the first and second obstruction plates (300 and 302) are circumferentially nested when the conduit obstructions plates are positioned in a common plane. For example, the first plate circumvents the second plate when the plates are in the same angular position with respect to axis 260 of the turbine bypass conduit 86, shown in FIG. 2, or an axis of the turbine inlet. However, it will be appreciated that in other examples, the plates (300 and 302) may not be circumferentially nested. For example, the first plate and second plate may be configured in half-moon shapes so as to each partially cover a portion of the turbine inlet conduit and the turbine bypass conduit.

The first and second conduits obstructions plates (300 and 302) may be positioned in a common plane. When each of the plates (300 and 302) are positioned perpendicular to axis 260 they substantially span turbine bypass conduit 86. In this way, the turbine bypass conduit is substantially blocked when the first plate and the second plate are positioned together in a first plane. The first plane may be perpendicular to the turbine bypass conduit in some embodiments. Exhaust gas flow may be substantially obstructed through turbine bypass conduit 86. Likewise, when both conduit obstruct plates are positioned perpendicular to axis 262 they substantially span a portion of exhaust manifold 48 leading into turbine inlet 204. In this way, the first and second plates substantially block the turbine inlet conduit when the first plate and the second plate are positioned together in a second plane. The second plane may be perpendicular to the turbine inlet conduit in some embodiments. Thus, flow may be substantially obstructed through the turbine 82. The first obstruction plate 300 is coupled to a first actuation shaft 306. Likewise, the second obstruction plate 302 is coupled to a second actuation shaft 308. Each of the plates (300 and 302) pivot about their corresponding actuation shafts (306 and 308). As depicted, the first and second actuation shafts are integrated. In particular, the first actuation shaft is at least partially enclosed by the second actuation shaft. However, other actuation shaft configurations are possible. Further in other examples, alternate mechanisms may be utilized to enable movement of the first and second plates, 300 and 302 respectively. For example, the plates may be configured to move in a direction parallel to axis 260 shown in FIG. 2. Furthermore, the second plate may seat and seal on a protrusion extending radially inwards from conduit wall 304 of the turbine bypass conduit. In this way, exhaust gas flow through the turbine bypass conduit may be substantially reduced or limited (e.g., including inhibited) during certain operating conditions. Various, valve configurations and valve controls schemas are discussed in greater detail herein.

An actuation assembly 310 may be configured to independently adjust the position of the plates (300 and 302). Actuation assembly 310 may be coupled to the first and second plates (300 and 302). As depicted, actuation assembly 310 is coupled to the first and second plates via the first and second actuation shafts, 306 and 308 respectively. However, in other embodiments, the actuation assembly may be coupled to the plates via an alternate suitable mechanical structure. For example, actuation assembly 310 may be configured to move the obstruction plates in a direction parallel to axis 260, shown in FIG. 2, to adjust the amount of exhaust gas flowing through turbine bypass conduit, as previously discussed.

Various suitable actuators may be used to adjust the position of the first and second plates (300 and 302). Thus, actuation assembly 310 may include a passive actuator 312 and/or an active actuator 314. It will be appreciated that the passive and/or active actuators may be configured to adjust the position of the first and/or second obstruction plates (300 and 302). In this way, the amount of exhaust gas flowing through turbine bypass conduit 86 may be adjusted. Various system configurations regarding the configuration of the actuator as well as method of control of valve 88 are discussed in greater detail herein.

Figure 4:
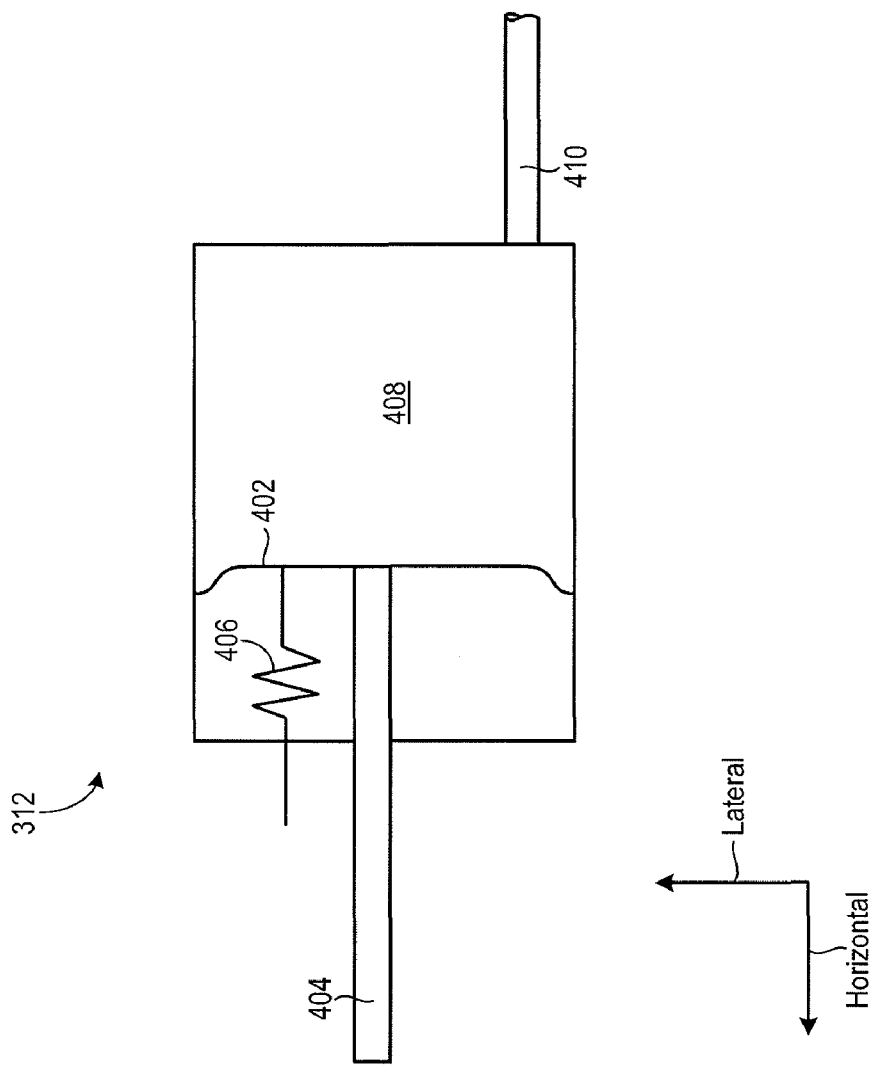
FIG. 4 shows a schematic depiction of a passive actuator that may be coupled to the valve shown in FIG. 2.

FIG. 4 shows an example passive actuator 312 that may be, in some examples, used to control the position of at least one of the obstruction plates (300 and 302) included in valve 88. Passive actuator 312 may be configured to adjust the amount of gas flowing through turbine bypass conduit 86, shown in FIG. 3, based on the temperature of the vehicle (e.g., engine). Therefore in some examples, an increase in engine temperature may decrease the amount of gas flowing through turbine bypass conduit 86, shown in FIG. 3, and visa-versa. In other words, the amount of obstruction provided by the valve in the turbine bypass conduit may be increased as the temperature of the engine increases.

Continuing with FIG. 4, passive actuator 312 may include a diaphragm 402 or piston coupled to a shaft 404. A spring 406 may be operatively coupled to diaphragm 402 to provide a resistance to movement of the diaphragm or piston. Passive actuator 312 may further include a fluid chamber 408 and a fluid inlet 410. Diaphragm 402 defines a boundary of fluid chamber 408. The working fluid in the passive actuator may be a suitable fluid, such as oil from the engine lubrication system. Shaft 404 may be coupled to shaft 306 and/or shaft 308, shown in FIG. 3.

It will be appreciated that the fluid in the passive actuator may expand and contract in response to an increasing and decreasing engine temperature. Therefore, during engine operation, the fluid in chamber 408 may exert and release force applied to diaphragm 402 such that diaphragm 402 moves in a horizontal direction. In this way, diaphragm 402 is configured to expand and contract in response to fluctuations in engine temperature. When the working fluid in the passive actuator 312 is oil from the engine lubrication system, the temperature of the oil may affect the oil pressure developed by the engine. Cold oil causes high engine oil pressure while hot oil causes low engine oil pressure. During some operating conditions such as during a cold start, it may be desirable to have the exhaust flow fully bypassing the turbine, thus the passive actuator 312 may be configured with proper diaphragm diameter and spring force to open valve 88 at a predetermined oil pressure (e.g., a high oil pressure). It will be appreciated that the horizontal and lateral axis are provided for conceptual understanding, and passive actuator 312 may be oriented in a number of different configurations when included in engine 10, shown in FIG. 1. When the diaphragm is moved in a horizontal direction, shaft 404 is also moved in a horizontal direction. In turn, horizontal movement of shaft 404 may initiate rotation of shaft 306 and/or 308. Rotation of shaft 306 and/or 308 may adjust the position of the first and/or second plates (300 and 302), shown in FIG. 2. Therefore, shaft 404 may move in a positive horizontal direction when the temperature of the fluid in fluid chamber 408 increases. Such operation initiates adjustment of the first and/or second plates. Subsequently, the pressure in fluid chamber 408 decreases and spring 406 provides a return force on diaphragm 402 when the temperature or pressure of the working fluid decreases. As a result, diaphragm 402 and shaft 404 move in an opposite horizontal direction when the temperature of the working fluid decreases. It will be appreciated that the properties of the components in passive actuator 312 may be selected based desired valve actuation temperatures or pressures. For example, the passive actuator may be configured to position a plate in the turbine bypass conduit when the engine temperature is above a first threshold temperature. The passive actuator mat also be configured to position the plate in the turbine inlet when the engine temperature is below a second threshold temperature. In this way, passive actuator 312 can actuate at least one of the plates (300 and 302), shown in FIG. 3, based on engine temperature. It will be appreciated that numerous suitable passive actuators may be utilized with a variety of mechanical configurations and passive actuator 312 shown in FIG. 4 is exemplary in nature. For example, the passive actuator may be comprised of bi-metalic spring. When a passive actuator it utilized to adjust the position of one or more of the plates, the cost of the vehicle may be decreased due to the small number of parts. Moreover, the likelihood of component degradation during engine operation may be decreased when compared to active actuators controller via an electronic controller.

In some examples, two separate actuators may be provided to adjust the position of the first plate 300 and the second plate 302. For example, a first passive actuator may be coupled to the first plate and a second passive actuator may be coupled to the second plate.

When two passive actuators are utilized, each actuator may be configured to adjust the position of the valve based on different temperatures or pressures. For example, the first passive actuator coupled to the first plate may be configured to position the first plate so that it is perpendicular to axis 260, shown in FIG. 2, when the engine temperature or pressure is above a first threshold value. Additionally, the second passive actuation assembly coupled to the second plate is positioned so that is substantially perpendicular to axis 260 when the engine is above a second threshold temperature or pressure, the second threshold temperature or pressure different from the first (e.g., greater than). Furthermore, the first passive actuator may be configured to position the first plate so that it is perpendicular to axis 262 when the engine is below a third threshold temperature or pressure, and the second passive actuator may be configured to position the first plate so that it is substantially perpendicular to axis 262 when the engine is below a fourth threshold temperature or pressure. In some examples, the third and fourth threshold temperatures or pressures are not equivalent.

The controllers 312 and 314 may be linked so that one actuator, which may be passive, actuates both primary and secondary plates, and a second actuator operates only the secondary actuator. This would be accomplished with a plate 310 having a hole through which the actuator 314 would move. The primary actuator could be a passive temperature sensitive device with the secondary actuary being a proportional position with active control.

In other examples, a first active actuator may be coupled to the first plate 300 and a second active actuator may be coupled to the second plate 302. Each of the active actuators may be configured to adjust the position of the corresponding plate based on signals from a suitable controller, such as controller 12, shown in FIGS. 1 and 2. In this way, the active actuators may adjust valve 88 according to a control scheme stored on memory. In such an example, the controller may be included in the actuation assembly.

Still further in some examples, the first plate 300 may be coupled to an active actuator and the second plate 302 may be coupled to a passive actuator or visa-versa.

As discussed above, valve 88 may be controller via passive actuation, active actuation, or a combination of passive and active actuation. Regardless of the type of actuation used to adjust valve 88, each plate (i.e., plate 300 and 302) may be independently adjusted. Thus, the first plate 300 may be configured to obstruct a portion of the turbine bypass conduit in a first position and obstruct a portion of the turbine inlet in a second position. Furthermore the second plate 302 may be configured to obstruct a portion of the bypass conduit in a first position and obstruct a portion of the turbine inlet in a second position. Additionally, the first plate may be adjusted in a number of additional positions in which the turbine inlet 204 or the turbine bypass conduit 86 is partially obstructed by the first plate. Likewise, the second plate may be adjust in a number of additional positions in which the turbine inlet 204 or the turbine bypass conduit 86 is partially obstructed by the second plate. Actuation assembly 310 may be configured to independently adjust the first and second plates in any of the aforementioned positions.

Figure 5:
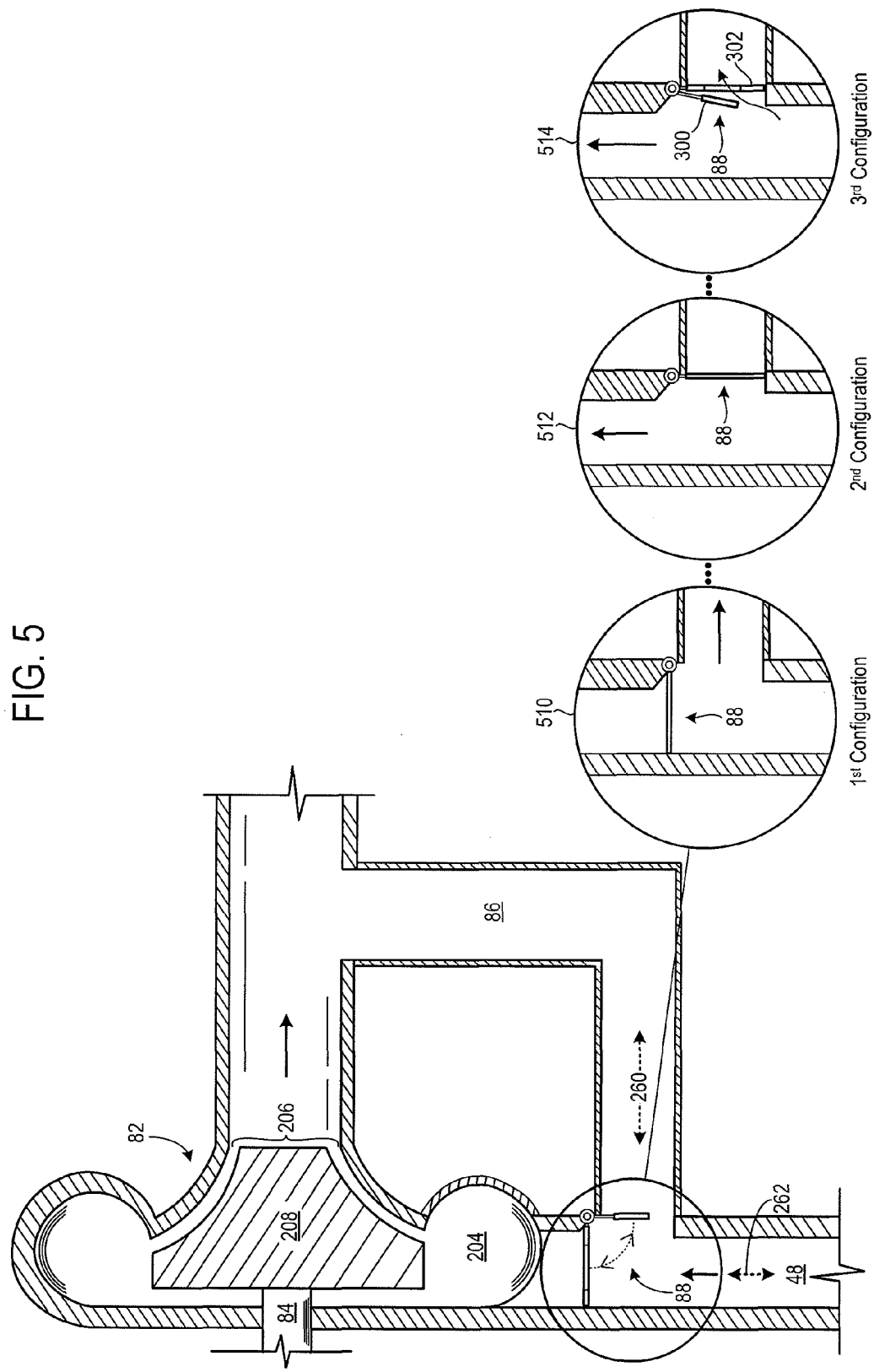
FIG. 5 shows another schematic depiction of the valve shown in FIG. 2 in various configurations.

FIG. 5 shows a schematic depiction of valve 88 in a number of different configurations. In a first configuration, as shown in a detailed view at 510, the first and second plates are arranged such that the flow of exhaust gases into turbine 82 is substantially inhibited. In this way, operation of the turbocharger may be substantially limited (i.e., little or no boost is provided to engine 10). The valve may be operated in the first configuration during low load conditions such as when the speed and/or temperature of the engine are below a threshold value or within a predetermined operating range. Specifically, in some examples, valve 88 may be operated in the first configuration during start-up (e.g., a cold start). A cold start may be characterized by an engine start-up that occurs when the engine is at or below a threshold temperature. In some examples, the threshold temperature may correspond to the ambient temperature. In this way, turbocharger operation may be limited during a cold start thereby decreasing the likelihood of turbocharger degradation that may be caused by movement of mechanical components during cold conditions where lubrication may be less effective.

In a second configuration, as shown in a detailed view at 512, the first and second plates (300 and 302) are arranged such that the flow of exhaust gases into the turbine bypass conduit 86 is substantially limited. In this way, the majority of the exhaust gas may be directed into the turbine 82. Therefore, the second configuration may be implemented when maximum boost is needed in the engine, such as during high load conditions when the engine temperature is above a threshold value, the engine speed and/or temperature is above a threshold value.

In a third configuration as shown in the detailed view at 514, the first and second obstruction plates are situated in the turbine bypass conduit, the first obstruction plate oriented to partially obstruct gas flow into turbine bypass conduit 86. In other words, the second obstruction plate may be oriented substantially perpendicular to axis 260 of turbine bypass conduit to reduce the amount of gas flow through the turbine bypass conduit and the first obstruction plate may oriented at non-perpendicular angle with respect to the axis of the turbine bypass conduit. Therefore, the position of the first plate may be adjusted (e.g., continuously or discretely) to alter the amount of gas provided to the turbine and therefore boost provided to the engine in the way a conventional wastegate would be used. In this way, small adjustment may be made to increase the engine's boost level during a multitude of operating conditions. In other words, the first plate may be used to as a wastegate or throttle to control the amount of gas provided to the turbine and therefore boost provided to the engine. FIGS. 2-5 are not drawn to scale.

The turbine 82, turbine bypass conduit 86, and valve 88 shown in FIGS. 2-5 provide for an exhaust valve including a first plate configured to obstruct a first portion of a turbine bypass conduit and a first portion of a turbine inlet conduit and a second plate configured to obstruct a second portion of the turbine bypass conduit and the turbine inlet conduit, the turbine bypass conduit substantially blocked when the first plate and the second plate are positioned together in a first plane. The exhaust valve may further include where the first plate and the second plate substantially block the turbine inlet conduit when the first plate and the second plate are positioned together in a second plane. In some examples, the first plate in the exhaust valve may be circumferentially nested within the second plate when the first plate and the second plate are positioned in the first plane or in the second plane.

Nesting the plates allows the plates to move independently and maintain a circular exhaust flow path.

Furthermore, the first plane may be perpendicular to the turbine bypass conduit and the second plane may be perpendicular to the turbine inlet conduit, in some examples. The first plate and the second plate may each pivot about a single actuation shaft in some examples. The exhaust valve may be adjustable in at least two configurations, a first configuration including a configuration in which the first and second plates are arranged such that a flow of exhaust gases into the turbine inlet conduit is substantially inhibited, a second configuration including a configuration in which the first and second plates are arranged such that the flow of exhaust gases into the turbine bypass conduit is substantially inhibited. In this way, the valve can direct exhaust flow through the exhaust system.

In some examples the exhaust valve may further comprise where the exhaust valve is adjustable in a configuration where the first and second plates are positioned in the turbine bypass conduit, and where at least one of the first and second plates partially obstruct exhaust gas flow into the turbine bypass conduit. The exhaust valve may further comprise an actuation assembly configured to independently adjust the first and second plates via a passive actuator that operates in response to an engine temperature.

Additionally, where the passive actuator includes a diaphragm defining a boundary of a fluid chamber, the diaphragm is configured to move in response to changes in a temperature or pressure. Further, in some embodiments the actuation assembly may be configured to decrease an amount of flow obstruction in the turbine bypass conduit during a cold engine start. Moreover, the actuation assembly may also be configured to increase an amount of flow obstruction in the turbine bypass conduit during a condition when a temperature or pressure of an engine is greater than a threshold temperature or pressure.

FIG. 6 shows a method 600 for control of a valve positioned in a turbine bypass conduit of a turbine in an engine. It will be appreciated that method 600 may be implemented by the systems and components described above or may be implemented via other suitable systems and components.

At 602, method 600 includes adjusting the exhaust valve to substantially obstruct exhaust gas flow through the turbine bypass conduit via a first plate circumferentially nested within a second plate. In some examples, adjusting the valve to substantially obstruct exhaust gas flow through the turbine bypass conduit is implemented when the engine output is above a threshold value and/or when the engine temperature is above a threshold value. As previously discussed, at least one of the first and second plates may be adjusted via a passive actuator configured to adjust the position of at least one of the plates based on engine temperature.

Next at 604, the method includes adjusting the exhaust valve to partially obstruct exhaust gas flow through the turbine bypass conduit via at least one of the first and second plates. In some examples, the exhaust valve is adjusted such that exhaust gases flow through the turbine bypass conduit substantially unobstructed when engine temperature is below a threshold value. Further in some examples, exhaust gas flow through the turbine bypass conduit is partially obstructed when engine speed is below a threshold value.

At 606, method 600 includes adjusting the exhaust valve to flow exhaust gases through the turbine bypass conduit substantially unobstructed. Method 600 ends after 606.

As will be appreciated by one of ordinary skill in the art, the method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage. It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A exhaust valve, comprising:
    a first plate configured to obstruct a first portion of a turbine bypass conduit and a first portion of a turbine inlet conduit; and
    a second plate configured to obstruct a second portion of the turbine bypass conduit and the turbine inlet conduit, the turbine bypass conduit substantially blocked when the first plate and the second plate are positioned together in a first plane.

2. The exhaust valve of claim 1, further comprises where the first plate and the second plate substantially block the turbine inlet conduit when the first plate and the second plate are positioned together in a second plane.

3. The exhaust valve of claim 2, where the first plate is circumferentially nested within the second plate when the first plate and the second plate are positioned in the first plane or in the second plane.

4. The exhaust valve of claim 2, where the first plane is perpendicular to the turbine bypass conduit and where the second plane is perpendicular to the turbine inlet conduit.

5. The exhaust valve of claim 1, where the first plate and the second plate each pivot about a single actuation shaft.

6. The exhaust valve of claim 1, wherein the exhaust valve is adjustable in at least two configurations, a first configuration including a configuration in which the first and second plates are arranged such that a flow of exhaust gases into the turbine inlet conduit is substantially inhibited, a second configuration including a configuration in which the first and second plates are arranged such that the flow of exhaust gases into the turbine bypass conduit is substantially inhibited.

7. The exhaust valve of claim 1, further comprising where the exhaust valve is adjustable in a configuration where the first and second plates are positioned in the turbine bypass conduit, and where at least one of the first and second plates partially obstruct exhaust gas flow into the turbine bypass conduit.

8. The exhaust valve of claim 1, further comprising an actuation assembly configured to independently adjust the first and second plates via a passive actuator that operates in response to an engine temperature.

9. The exhaust valve of claim 8, where the passive actuator includes a diaphragm defining a boundary of a fluid chamber, the diaphragm configured to move in response to changes in a temperature.

10. The exhaust valve of claim 9, where the actuation assembly is configured to decrease an amount of flow obstruction in the turbine bypass conduit during a cold engine start.

11. The exhaust valve of claim 9, where the actuation assembly is configured to increase an amount of flow obstruction in the turbine bypass conduit during a condition when a temperature of an engine is greater than a threshold temperature.

12. A method for controlling an exhaust valve, comprising:
adjusting the exhaust valve to substantially obstruct exhaust gas flow through a turbine bypass conduit via a first plate and a second plate of the exhaust valve during a first engine operating condition; and
adjusting the exhaust valve to partially obstruct exhaust gas flow through the turbine bypass conduit via at least one of the first and second plates during a second engine operating condition.

13. The method of claim 12, where the first plate is circumferentially nested within the second plate.

14. The method of claim 12, further comprising adjusting the exhaust valve such that exhaust gases flow through the turbine bypass conduit substantially unobstructed during a third engine operating condition.

15. The method of claim 14, where the third engine operating condition is a temperature of an engine less than a threshold temperature.

16. The method of claim 12, where at least one of the first and second plates are adjusted via a passive actuator in response to a temperature.

17. The method of claim 12, further comprising adjusting the first and second plates to substantially obstruct exhaust gas flow through a turbine during a third engine operating condition.

18. A valve disposed in an engine exhaust system, comprising:
a first plate partially spanning a portion of a turbine bypass conduit while in a first position and to obstruct a portion of a turbine inlet conduit while in a second position;
a second plate partially spanning a portion of the turbine bypass conduit while in a first position and partially spanning a portion of the turbine inlet conduit while in a second position, where the first plate is in a same plane as the second obstruction plate when the first plate is in its first position and when the second plate is its first position; and
an actuation assembly coupled to the first and second plates via a separate actuation shafts, the actuation assembly configured to independently adjust the first and second plates.

19. The valve of claim 18, where the first plate is circumferentially nested within the second plate.

20. The valve of claim 18, where the valve is adjustable in at least two configurations, a first configuration including a configuration where the first and second plates are arranged such that flow of exhaust gases into the turbine inlet conduit is substantially inhibited, a second configuration including a configuration where the first and second plates are arranged such that flow of exhaust gases into the turbine bypass conduit is substantially inhibited.

\* \* \* \* \*